United States Patent
Díaz-López

(10) Patent No.: US 7,375,646 B1
(45) Date of Patent: *May 20, 2008

(54) SEISMIC DETECTION AND RESPONSE SYSTEM

(76) Inventor: William Díaz-López, P.O. Box 1081, Trujillo Alto, PR (US) 00978

( * ) Notice: Subject to any disclaimer, the term of this patent is extended or adjusted under 35 U.S.C. 154(b) by 17 days.

This patent is subject to a terminal disclaimer.

(21) Appl. No.: 11/418,679

(22) Filed: May 5, 2006

Related U.S. Application Data

(63) Continuation-in-part of application No. 11/081,977, filed on Mar. 16, 2005, which is a continuation-in-part of application No. 11/015,134, filed on Dec. 17, 2004, now Pat. No. 7,042,365, which is a continuation-in-part of application No. 10/439,160, filed on May 15, 2003, now Pat. No. 6,909,375.

(60) Provisional application No. 60/381,372, filed on May 20, 2002.

(51) Int. Cl.
    G08B 21/00 (2006.01)
(52) U.S. Cl. ............. 340/690; 340/689; 340/521; 367/13
(58) Field of Classification Search ............ 340/690, 340/689, 521, 686.1, 539.22, 539.26, 566, 340/522; 367/197–199, 13; 73/35.14
    See application file for complete search history.

(56) References Cited

U.S. PATENT DOCUMENTS

| | | | |
|---|---|---|---|
| 4,180,287 A | 12/1979 | Youngblood et al. | |
| 4,354,699 A | 10/1982 | Logan | |
| 4,480,480 A | 11/1984 | Scott et al. | |
| 4,528,559 A | 7/1985 | Freeman | |
| 4,539,555 A | 9/1985 | Tefka | |
| 4,652,862 A | 3/1987 | Verslycken | |
| 4,703,962 A | 11/1987 | Kelly et al. | |
| 4,803,482 A | 2/1989 | Verslycken | |
| 4,945,347 A | 7/1990 | Perry | |
| 4,995,651 A | 2/1991 | Wardlaw | |
| 5,101,195 A * | 3/1992 | Caillat et al. | 340/690 |
| 5,149,157 A | 9/1992 | Laugery et al. | |
| 5,307,054 A | 4/1994 | Concannon, Sr. et al. | |
| 5,412,616 A | 5/1995 | González | |
| 5,420,380 A | 5/1995 | Harben et al. | |
| 5,429,399 A | 7/1995 | Geringer et al. | |
| 5,436,416 A | 7/1995 | Fletcher | |
| 5,479,151 A | 12/1995 | Lavelle et al. | |
| 5,563,575 A | 10/1996 | Yamamura | |
| 5,625,348 A | 4/1997 | Farnsworth et al. | |
| 5,684,249 A * | 11/1997 | Abe et al. | 73/146 |
| 5,724,893 A | 3/1998 | Lee et al. | |

(Continued)

OTHER PUBLICATIONS

U.S. Appl. No. 10/078,607, filed Feb. 19, 2002, Díaz-López.

(Continued)

*Primary Examiner*—Anh V La
(74) *Attorney, Agent, or Firm*—John Ryznic

(57) ABSTRACT

A seismic switch is a programmable device capable of distinguishing between seismic movements due to an earthquake or an explosion, which is used to send a signal to control panels for security doors. The device uses accelerometers and a microcontroller for the detection and signal analysis of the seismic movements. In the event of an explosion or earthquake, the device produces an alarm.

25 Claims, 14 Drawing Sheets

U.S. PATENT DOCUMENTS

| | | |
|---|---|---|
| 5,742,235 A | 4/1998 | Miché |
| 5,839,766 A | 11/1998 | Iannuzzi et al. |
| 5,992,094 A | 11/1999 | Diaz |
| 5,996,416 A * | 12/1999 | Eguchi ......................... 73/655 |
| 6,049,287 A | 4/2000 | Yulkowski |
| 6,121,888 A * | 9/2000 | Bognar ....................... 340/690 |
| 6,253,156 B1 * | 6/2001 | Bui-Tran et al. .............. 702/17 |
| 6,265,979 B1 | 7/2001 | Chen et al. |
| 6,292,108 B1 | 9/2001 | Straser et al. |
| 6,298,603 B1 | 10/2001 | Diaz |
| 6,308,644 B1 | 10/2001 | Diaz |
| 6,311,714 B1 | 11/2001 | Watanabe |
| 6,356,204 B1 | 3/2002 | Guindi et al. |
| 6,392,538 B1 | 5/2002 | Shere |
| 6,414,601 B1 | 7/2002 | Massedonio |
| 6,476,858 B1 | 11/2002 | Díaz |
| 6,518,878 B1 | 2/2003 | Skoff |
| 6,661,346 B1 | 12/2003 | Wood et al. |
| 6,909,375 B2 | 6/2005 | Díaz-López |
| 7,042,365 B1 | 5/2006 | Díaz-López |
| 2003/9914919 | 1/2003 | Díaz |

OTHER PUBLICATIONS

U.S. Appl. No. 11/081,977, filed Mar. 16, 2005, Díaz-López.
American Society of Civil Engineers—Earthquake-Actuated Automatic Gas Shutoff Devices—booklet—1999—American Society of Civil Engineers—USA.
APS Dynamic, Inc.—Systems for Generating Controlled Vibration—Internet—2004—USA.
Securitron Magnalock Corp.—Securitron Power Supplies—Booklet—2003—USA.
ADT Security Systems—Unimode 5 Fire Control Communicator—Product Information, Installation, Programming and Operation Manual—1995—USA.

\* cited by examiner

FRONT

BACK

SEISMIC DETECTION AND RESPONSE SYSTEM

PRIORITY

This application is a continuation-in-part of U.S. patent application Ser. No. 11/081,977 filed on Mar. 16, 2005, which is a continuation-in-part of U.S. patent application Ser. No. 11/015,134 filed on Dec. 17, 2004, which is a continuation-in-part of U.S. patent application Ser. No. 10/439,160, filed on May 15, 2003, which claims benefit of U.S. Provisional Patent Application No. 60/381,372, filed on May 20, 2002.

FIELD OF THE INVENTION

The invention relates generally to seismic detection systems and methods of operating such systems.

BACKGROUND OF THE INVENTION

Modern security systems have become increasingly sophisticated. Today, they are able to monitor for break-ins, smoke, fire, chemical releases and a host of other conditions requiring appropriate response. Often, these security systems interface not only with alarms to alert people of the emergency condition but also with remote monitoring facilities and emergency response teams such as the police or fire departments. In addition, these security systems can control the activation of sprinklers, the release of doors and other control functions.

Upon the detection of smoke, fire or other emergency conditions, it is critical to release doors, especially in crowded commercial establishments. The failure to release a single door can cause crowd panic and has in some instances resulted in the loss of life. For this reason, many methods have been applied to releasing doors under emergency conditions.

Some representative examples include: (1) U.S. Pat. No. 6,265,979, titled "Earthquake Sensing Device," to Chen et al.; (2) U.S. Pat. No. 6,049,287, titled "Door with Integrated Smoke Detector and Hold Open," to Yulkowski; (3) U.S. Pat. No. 5,429,399, titled "Electronic Delayed Egress Locking System," to Geringer et al.; and (4) U.S. Pat. No. 4,803,482, titled "Exit Control and Surveillance System," to Verslycken. Each is incorporated herein in their entirety and each is described briefly in turn.

U.S. Pat. No. 6,265,979 generally teaches a device for detecting an earthquake and for controlling emergency functions. The device measures both horizontal and vertical vibrations. Based upon those measurements, the device determines whether an earthquake has occurred and if so releases doors.

U.S. Pat. No. 6,049,287 generally teaches a door control device that automatically releases a door upon detection of smoke. The door control device is physically mounted on the door and releases associated electronic locks.

U.S. Pat. No. 5,429,399 generally teaches a door control device that receives various alarm signals including smoke or seismic activity. In response to these alarm signals, the door control automatically releases associated door locks.

Finally, U.S. Pat. No. 4,803,482 generally teaches a door release and surveillance system. The door release is requested by a person by pressing a release lever at the door. This sends a signal to a central control location. The central location can monitor the door through a surveillance system. In response to the request it can elect to permit the door to release. Alternatively, it can delay or prevent the door from releasing should the central control location determine that there is not an emergency condition and the door should remain locked.

While each of these systems may serve their intended purpose, an important practical consideration is testing. Just like a fire alarm system, a seismic detection system should be periodically tested to ensure that it remains in proper operational condition. Accordingly, a system is desired which permits convenient, periodic testing and reliable operation.

SUMMARY OF THE INVENTION

It is an object of the invention to provide a system capable of detecting seismic activity and it is a further object of the invention that such system permits convenient, periodic testing and reliable operation.

According to one aspect of the invention, a seismic detection system includes a housing, at least one seismic sensors, detection circuitry, an indicator and at least one external device. The seismic sensors are contained within the housing and generate electrical signals in response to seismic movement. The detection circuitry is also contained within the housing and is operably coupled with the seismic sensors to receive the signals. The detection circuitry is configured to detect the occurrence of a seismic event based on the signals. The indicator is mounted on the housing and is operably coupled with the detection circuitry. The indicator is configured to generate an alarm upon detection of the seismic event. The external device communicates with the detection circuitry and is positioned remotely from the housing. It is configured to perform additional security functions.

According to further aspects of the invention, the seismic sensors are accelerometers and are positioned perpendicular with respect to each other. The housing is provided with mounting holes for securing the housing to a building. The detection circuitry includes at least two amplifiers, a processor and at least one relay. The amplifiers each receive signals from a corresponding one of the seismic sensors to generate amplified signals. The processor, which receives the amplified signals, is configured to determine the occurrence of the seismic event based on analysis of the amplified signals. The relay, upon detection of the seismic event, activates the at least one indicator. The processor is further configured to classify the seismic event as being either of an earthquake or an explosion. The indicator is either an audible alarm or a light indicator. The external device is, for example, a building access system, a fire detection system, an intrusion detection system, a door release mechanism or a communications link. The communications link is configured to notify emergency personnel upon detection of the seismic event.

According to further aspects of the invention, the seismic detection system includes a ready condition indicator and a manual reset switch. The ready condition indicator is connected to the detection circuitry and comprises an LED mounted on the housing. Upon activation, it indicates that the system is operational. It is deactivated upon detection of the seismic event. The manual reset switch is operably connected to the ready condition indicator and the detection circuitry. It is configured to allow resetting the seismic detection system after detection of the seismic event.

According to another aspect of the invention, a seismic sensor includes a plurality of accelerometers, a pressure sensor, a controller, a door release circuit and an emergency call circuit. The controller is operationally coupled with the plurality of accelerometers and the pressure sensor. The controller is configured to monitor signals from the plurality of accelerometers and the pressure sensor to detect an earthquake and to detect an explosion. The controller distinguishes an earthquake from an explosion based upon a signal from the pressure sensor and/or seismic sensor. The controller is operationally coupled with the door release circuit and configured to release a door upon detection of an earthquake or an explosion. The controller is also operationally coupled with the emergency call circuit and configured to initiate an emergency call upon detection of an explosion but not upon detection of an earthquake.

According to further aspects of the invention, the plurality of accelerometers include a first accelerometer configured to detect vibrations along a first axis and a second accelerometer configured to detect vibrations along a second axis, orthogonal to the first axis. The controller includes analog-to-digital converters. The signals from the plurality of accelerometers and the pressure sensor are received and converted by the analog-to-digital converters. The door release circuit includes a relay for releasing a door. The emergency call circuit includes a relay for activating a pre-recorded call to an emergency responder. The seismic sensor also includes an alarm indicator and a keyed reset. The alarm indicator is operationally coupled with the controller and configured to indicate an alarm condition upon detection of an earthquake or an explosion. The keyed reset is operationally coupled with the controller to reset the alarm condition.

According to another aspect of the invention, a seismic switch has a plurality of accelerometers, a pressure sensor and a controller. The controller is operationally coupled with the plurality of accelerometers and the pressure sensor. The controller monitors signals from the plurality of accelerometers and the pressure sensor to detect an earthquake and to detect an explosion. The controller distinguished an earthquake from an explosion based upon a signal from the pressure sensor and/or accelerometers. The controller releases at least one door and activates an emergency call circuit upon detection of an explosion. The controller releases at least one door but does not activate the emergency call circuit upon detection of an earthquake.

According to further aspects of the invention, the seismic sensor is fixedly mounted. It is then periodically dismounted and placed on a vibration table. The vibration table is operated to simulate the condition of an earthquake. In addition, the seismic sensor includes a blast sensor for detecting pressure increases associated with an explosion. This sensor is put in a pressurized container, and pressure is increased to a level that would trigger the blast sensor. The seismic sensor is re-mounted when it properly operates to detect an earthquake in response to the simulated condition of the earthquake and to detect an explosion in response to the simulated condition of the explosion.

According to another aspect of the invention, a seismic switch is periodically tested. The seismic switch is mounted on a shaker table. The shaker table simulates a first tremor having an amplitude less than a pre-determined amplitude so that the seismic switch does not activate an alarm condition. The shaker table simulates a second tremor having an amplitude greater than the predetermined amplitude so that the seismic switch does activate an alarm condition. The seismic switch is removed from the shaker table and rotated by 90 degrees. The seismic switch is remounted on the shaker table to test the seismic switch along another axis by repeating the forgoing steps.

According to further aspects of the invention, the shaker table is driven by a signal generator, which simulates the first tremor and the second tremor by a sinusoid. The first tremor is less than 0.065 g and the second tremor is greater than 0.065 g. The frequency of the first tremor is greater than 10 Hz and the frequency of the second-tremor is between approximately 1 and 10 Hz.

According to further aspects of the invention, the shaker table is driven by a controller that simulates the first and second tremor to match the profile of data obtained from an earthquake. The amplitude of the first tremor is less than 0.065 g and the amplitude of the second tremor is greater than 0.065 g. The first tremor has a duration of less than 2 seconds and the second tremor has a duration of at least approximately 4 seconds.

DETAILED DESCRIPTION OF THE INVENTION

In one preferred embodiment, a seismic detection and control circuit is connected with an external security or fire system capable of activating alarms, releasing doors, initiating emergency calls and other control functions. In the event of seismic activity, the detection circuit determines whether an explosion or earthquake has occurred. If so, the control circuit activates the external security systems. In the event of an explosion, the alarm condition is forwarded to emergency responders such as the fire department. In the event of an earthquake, the alarm condition is not forwarded to emergency responders to avoid over-loading their communication systems. (The emergency responders in the area would not need notice because they would also be experiencing the earthquake conditions). Preferably, the seismic detection and control circuit is enclosed within an explosion proof box. On the front face, status lights indicate whether the device is active and whether an alarm condition has been detected, and control switches for testing and resetting the detection and control circuit are accessible to a user. Preferred embodiments and methods of operation are described further below with reference to the figures.

Figure 1:
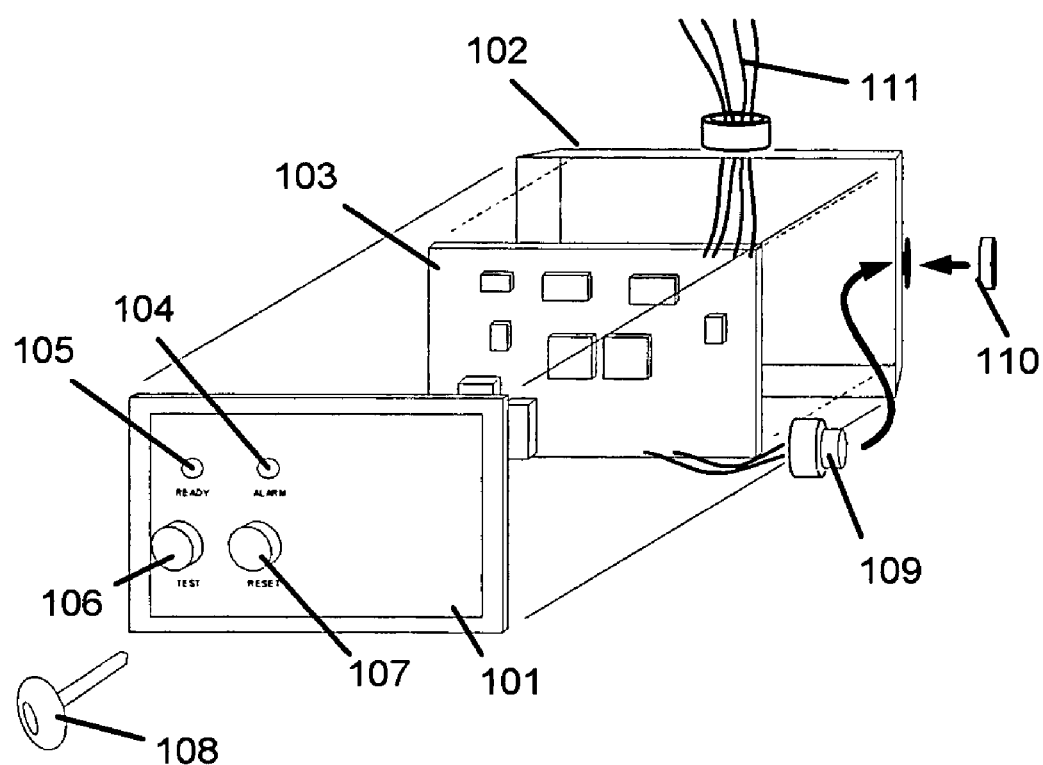
FIG. 1 is an exploded view of one preferred embodiment of a seismic switch.
Figure 2A:
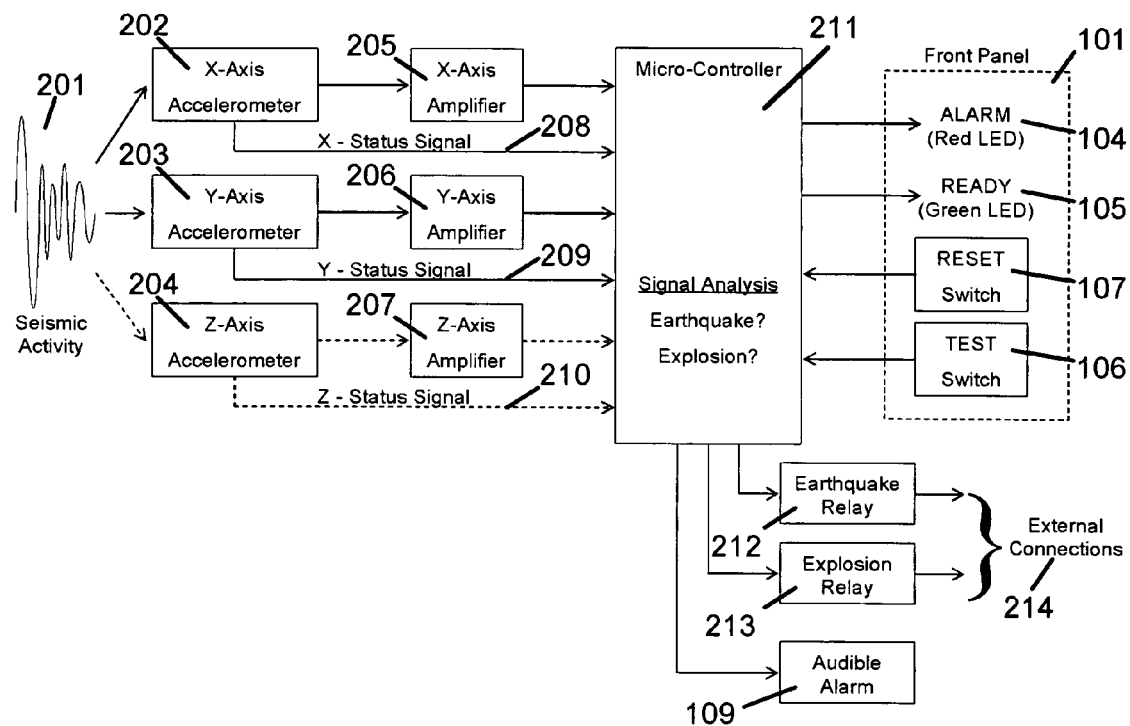
FIG. 2A is a functional block diagram of the seismic switch.
Figure 6:
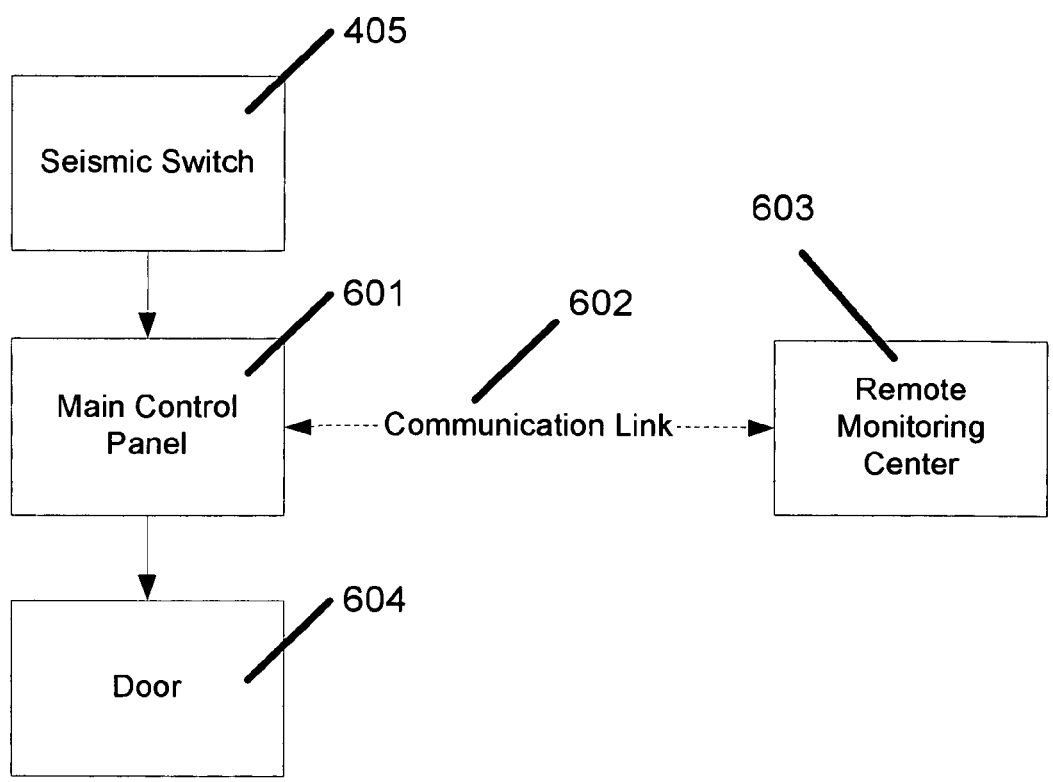
FIG. 6 is a functional block diagram of the seismic switch as it interacts with a typical security access control circuit.

Turning to FIG. 1, one preferred embodiment of a seismic control switch is described. Specifically, a seismic switch control circuit (103) is enclosed in a metal case (102) and has on the front panel (101) two push-button or keyed switches (106 and 107) and two indicator lights in the form of light emitting diodes or LEDs (104 and 105). The front panel (101) and the metal case (102) have mounting holes proximate their corners to permit mounting bolts to pass through for securing the seismic control switch in place. A red LED (104) is labeled "Alarm." This light's turning on means that the microcontroller analyzed the detected vibrations and concluded that the vibrations were due to either an earthquake or an explosion and that an ALARM condition exists. A green LED (105) is labeled "Ready." This LED indicates that the system has performed a self test and that all tested parts are working correctly. The switch labeled "Test" (106) is used to instruct the microcontroller to test the ALARM condition, the relays (212 and 213, which are shown in FIG. 2A), the audible alarm or buzzer (109), and the external circuit to which the seismic switch is connected (601, 602, 603, and 604, which are shown in FIG. 6). The audible alarm (109) is mounted on a side wall of the metal case (102) and is held in place by an external nut (110). The "Reset" switch (107) forces the microcontroller to clear the ALARM condition and to return to the initial state, including performing the "Test" function described above. Wires (111) for power and other connections to the external security system pass through a hole in the top face of the metal case (102).

Turning to FIG. 2A, one preferred embodiment of the detection and control circuit is further described. During normal operation the Ready LED (105) remains on. If a seismic signal (201) is detected by the accelerometers (202, 203, and 204), it is decomposed into X, Y, and Z components and converted to electronic signals. These are passed through amplifiers (205, 206, and 207) and are input into the microcontroller (211) for signal analysis. The analysis determines whether the incoming signals correspond to an earthquake, an explosion, or neither. If the signals are interpreted as being those resulting from an earthquake, the ALARM LED (104) is turned on, the Ready LED (105) is turned off, the earthquake relay (212) is activated, and the audible alarm (109) is turned on. If the signals correspond to an explosion, a similar sequence of events is triggered; the ALARM LED (104) is turned on, the Ready LED (105) is turned off, the explosion relay (213) is activated, the audible alarm (109) is turned on, and, in addition, an emergency communication system (603) is activated by the explosion relay (213) to inform emergency responders such as the fire department. The circuit can only be reset back to normal operation through the manual activation of the RESET switch (107) by authorized personnel. In one preferred embodiment, a keyed switch is used, so that resetting the device requires the right key (108). In another preferred embodiment, the reset is a pushbutton switch. So that only authorized persons can reset the device, the seismic switch is typically mounted within keyed box or otherwise restricted area.

The circuit for the two-dimensional seismic switch is composed of eight main components as shown in FIG. 2A, namely two accelerometers (202 and 203), two amplifiers (205 and 206), a microcontroller (211), two relays (212 and 213), and a buzzer (109). Each accelerometer-amplifier pair corresponds to one of the Cartesian X and Y directions making up the horizontal plane, with a 90° angle between their axis. The extra components needed for the three-dimensional version of the seismic switch are also shown in FIG. 2A using dashed lines: an accelerometer (204) and an amplifier (207). These would be used to detect vibrations in the Z (or vertical) direction. The accelerometers convert changes in velocity (acceleration) into electronic voltage signals. These signals are then amplified to increase the instrument's sensitivity to seismic movement (201). The amplified signals are then fed into the microcontroller's analog-to-digital converters (ADCs), which automatically convert the signals to digitally encoded representations of the signals. The microcontroller (211) has subroutines to continuously monitor incoming signals and, in the event that it recognizes a signal's characteristics as those pertaining to an earthquake or an explosion, it activates the earthquake relay (212) or the explosion relay (213), respectively. At the same time, an audible signal is produced by the buzzer (109). The signal patterns of interest have been pre-programmed into the microcontroller (211) using tables that correlate each accelerometer's digitally encoded signal amplitudes, plus the signal's period, and thus its frequency. These tables are explained below, as part of the microcontroller's programming.

The microcontroller unit (211), or MCU, chosen to implement the seismic switch is a Motorola MC68HC908GP32 8-bit microcontroller. This microcontroller has 32 kB of FLASH memory, so that it can be programmed using C code to suit the application's needs. In addition, the MCU has two timers, eight channels of analog-to-digital converters, and a serial port, which allows for programming the unit after installation.

Figure 2B:
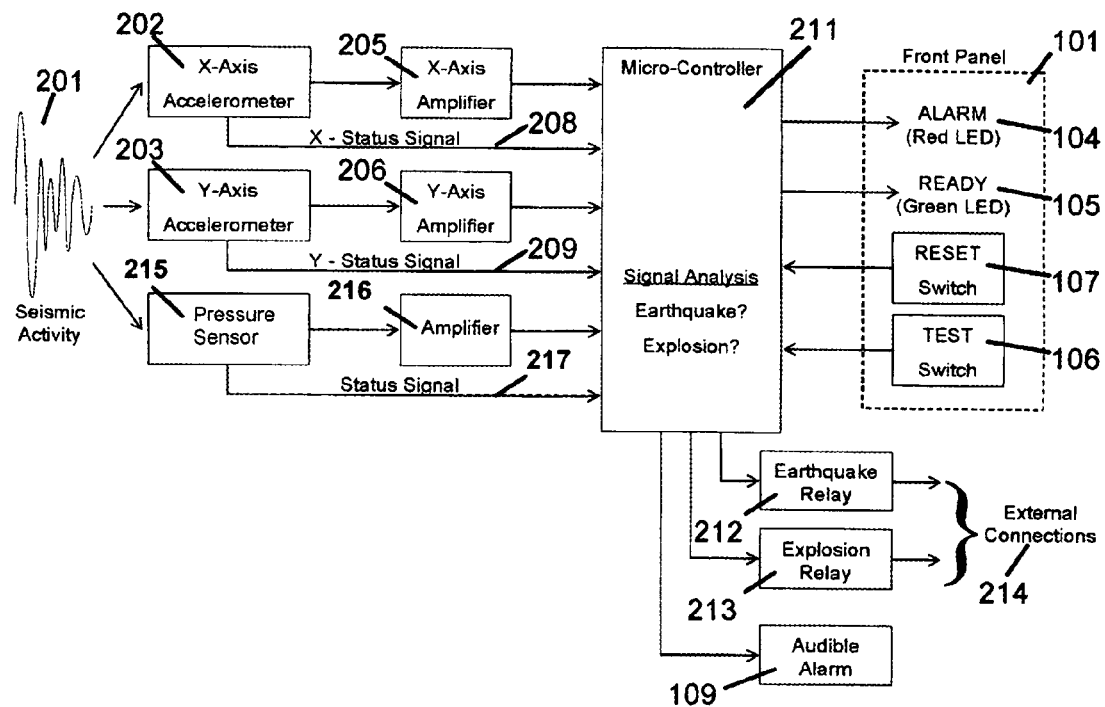
FIG. 2B is a functional block diagram of another seismic switch.

In an alternative embodiment of a seismic switch shown in FIG. 2B, a pressure sensor (215) is provided. Its signal is powered or amplified by amplifier (216). The other parts or functional elements having the same numbers as in FIG. 2A perform the same functions as described above. The signal from the pressure sensor (215) is then fed to the microcontroller (211). The pressure sensor (215) is used to distinguish or detect an explosion. While both an earthquake and an explosion will generate detectable vibration signals, an explosion will typically generate much larger changes in pressure which can be used both to detect an explosion and to distinguish associated vibration signals from those of an earthquake. A threshold level is set. If a vibration is detected and the pressure signal exceeds the threshold, then an explosion has been detected. The threshold for vibration is preferably set at approximately 0.065 g, but can be set slightly higher at, for example, 0.07 g or 0.1 g. The threshold for the change in pressure can be set based upon the desired sensitivity. Although shown as part of the seismic switch, the pressure sensor (215), is mounted remotely. It should not be housed within the box containing the other elements of the seismic switch because it needs to fully sense changes in pressure. Mounting the pressure sensor inside a box would tend to dampen such changes.

Figure 3A:
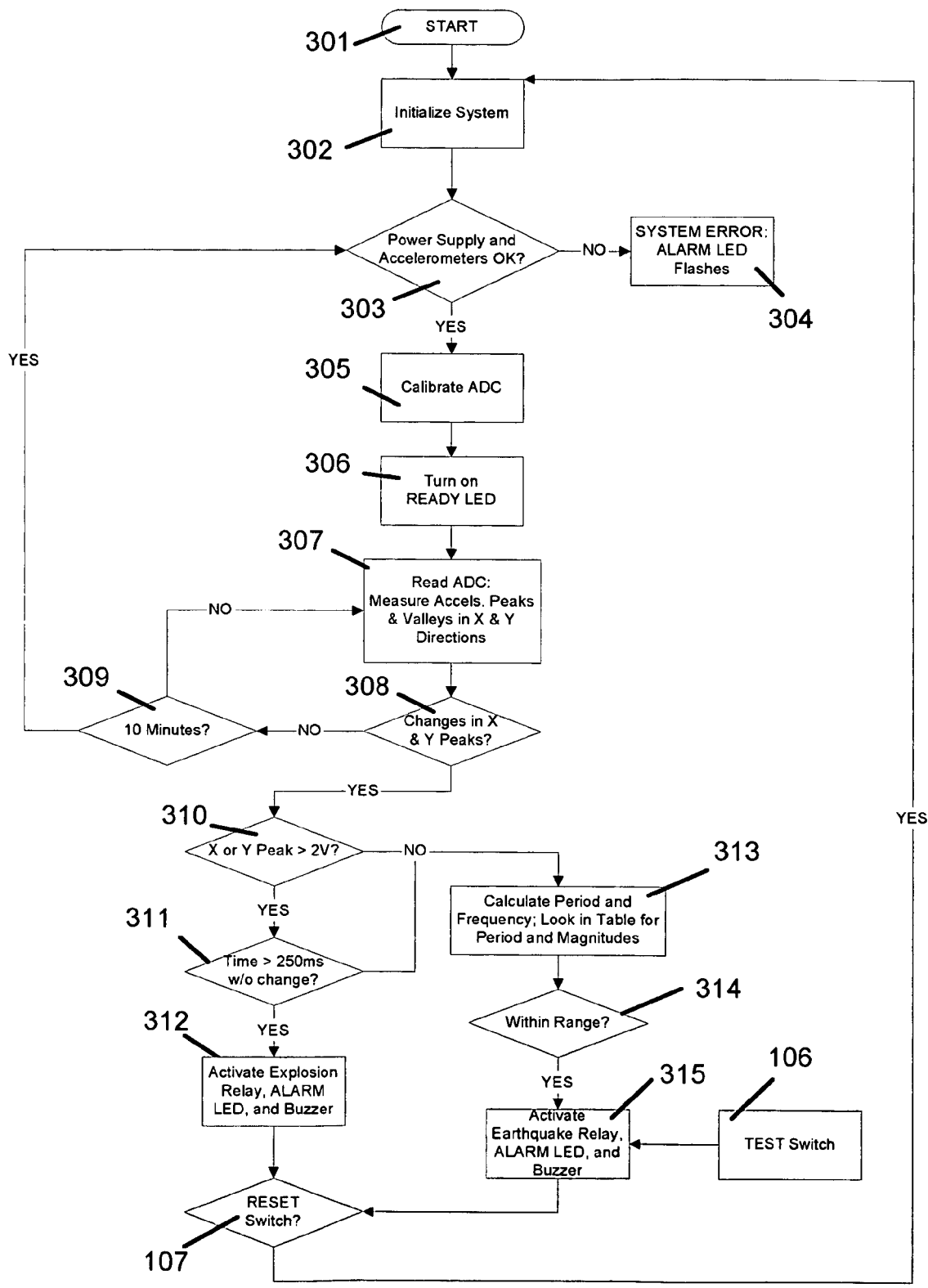
FIG. 3A is a flowchart of the control algorithm for the seismic switch of FIG. 2A.

Turning to FIG. 3A, one preferred method of operating the seismic switch is described. When the unit is initially turned-on (301) or the RESET (107) switch is activated, the MCU initializes (302) the complete system, checks the power supplies and accelerometers (303), and then proceeds to take samples at the ADC inputs being used in order to calibrate the system (305). The accelerometers have status signals (208, 209, and 210) that are monitored by the MCU. If an error is detected during the initialization or testing stages (303), the MCU will make the red ALARM LED (104) continuously flash to indicate that a system error has occurred (304). Once the MCU has initialized, tested and calibrated the unit, it turns on the green Ready LED (105) to indicate that the system is working properly (306).

The MCU then goes into its regular mode of operation. It will read data (307) from the accelerometer-amplifier pairs to monitor changes in either the X or Y signals amplitudes. While sampling is performed, the peaks and valleys pertaining to each signal are averaged to reduce possible noise and false alarms. If ten minutes pass (309) and there are no significant and sustained changes in any of the peaks or valleys (308), the MCU will cycle through the testing and calibration sections and repeat the monitoring stage for another ten minutes. This pattern of sampling for ten minutes and testing will go on until changes occur in the peaks and valleys (308) or until the unit is set to the TEST mode via the TEST switch (106), to the RESET mode with the RESET switch (107), or if the unit is turned off by disconnection.

In order to detect the occurrence of an explosion, the occurrence of amplifier output saturation is monitored. If either X or Y amplifier (205 and 206) voltages exceed 2V (310) (corresponding to 0.33 g) for 250 milliseconds (311), the signal is interpreted as being due to an explosion and the actions pertaining to an explosion (312) are taken: namely, the ALARM LED (212) is turned on, the audible alarm is activated (109), and an emergency call is placed to a central monitoring center (603) and local authorities through a communication link (602). Since averaging of the input signals is being performed, noise effects and transients are filtered, thus minimizing the possibility of false triggering.

Figure 4:
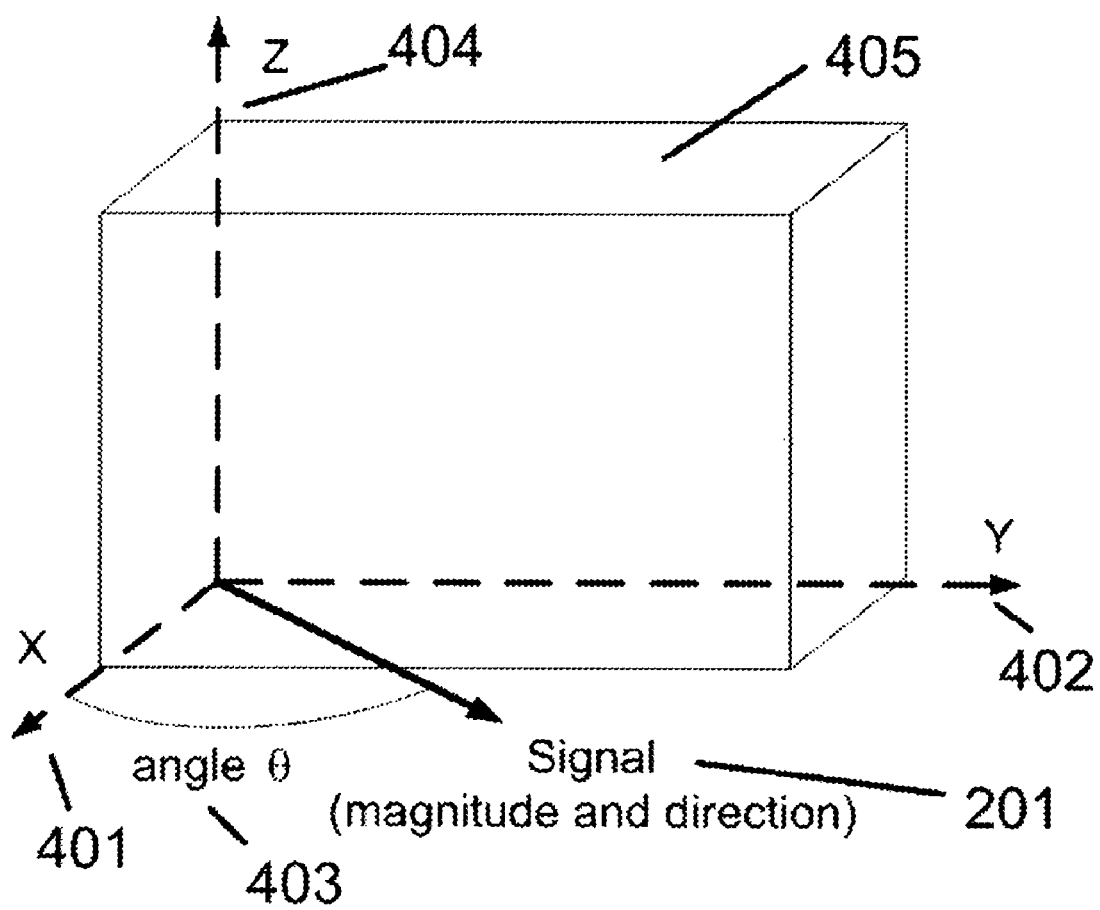
FIG. 4 is a perspective view of the seismic switch depicting the angle made from the signal to the seismic switch X-axis.

With reference to FIG. 4, the principle of operation behind one preferred earthquake signal analysis algorithm is now described. When a traveling signal (201) approaches a point in space, it possesses two important components, namely magnitude and direction, which together define the signal as a vector. If the magnitude and direction are known, the signal vector can be decomposed into X and Y components in the X (401) and Y (402) axis, respectively. By defining the angle (direction) between the X-axis (401) and the signal vector (201) as theta (θ) (403), simple trigonometry allows for vector decomposition into X and Y components: the X component being the signal's amplitude times the cosine of θ, and the Y component being the signal's amplitude times sine of θ. At the same time, the acceleration forces (relative to Earth's gravitational acceleration, g) in an earthquake's signal represent the magnitude of the vector. Thus, the key element for the seismic switch (405) is to determine if the signal's amplitude, frequency, and duration is that from an earthquake. The amplitude requirement can be analyzed by setting an acceleration threshold value, so that if the signal's magnitude (acceleration) is greater than this threshold, it establishes the possibility that the signal might be that from an earthquake. To accomplish this, the threshold is decomposed into its X and Y components, converted to their respective digital equivalent representations and included in the code as a table. This allows for the MCU to compare these values to the digitized signals from the X and Y accelerometers. If both the X and Y components of the detected signal are larger than the corresponding threshold values (308), the signal could be that from an earthquake.

The signal's period and/or frequency are then needed to complete this two-part test. The program uses one of the MCU's internal timers to keep track of when peaks or valleys occur for each of the accelerometer-amplifier pairs (X and Y). The time difference between the occurrence of a peak and a valley corresponds to half a cycle, so by multiplying this time difference by two, the instantaneous signal period is obtained. A second table is used to correlate the period to the signal's intensity (313, which step is shown in FIG. 3A). If the overall signal magnitude (combination of X and Y) is larger than the threshold for a particular time period, the signal is interpreted as being that from an earthquake (314). The microcontroller then proceeds to the earthquake ALARM condition (315). Here, the ALARM LED (104) and buzzer (109) are activated, along with earthquake relay (212). These remain activated until reset (107).

Figure 5:
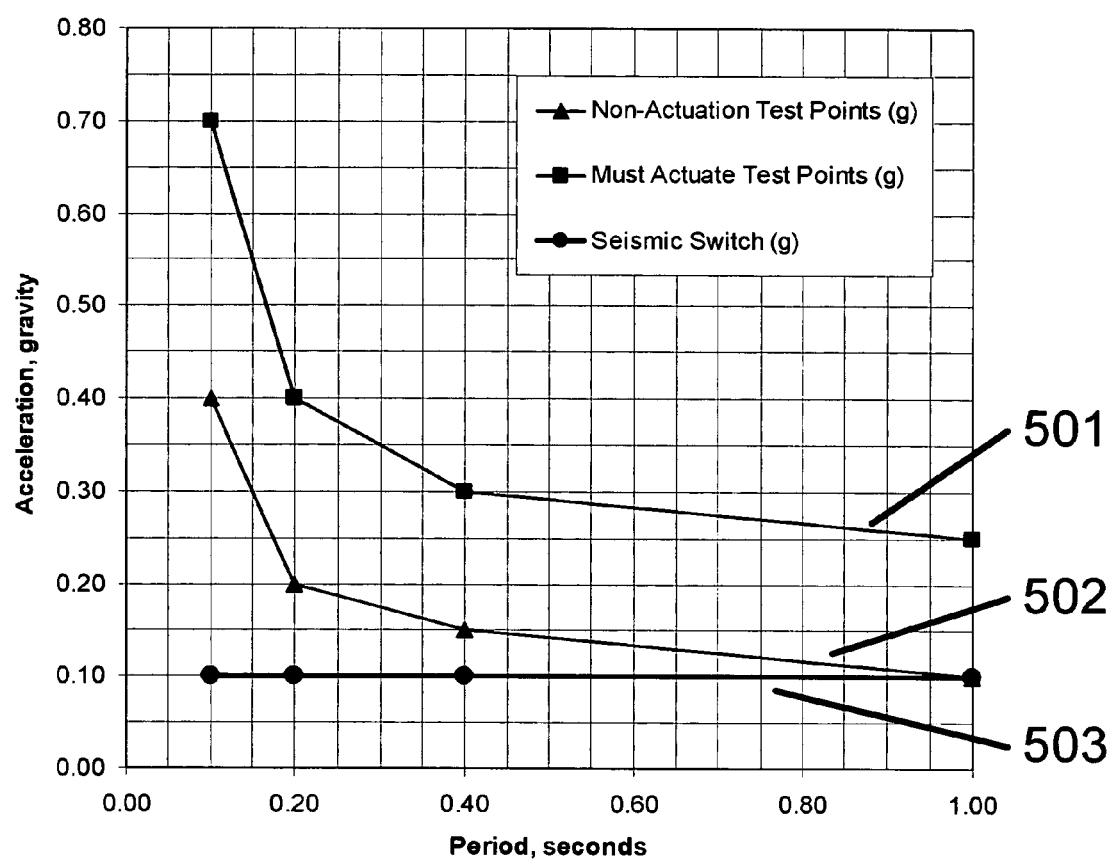
FIG. 5 is a graph showing the values required for earthquake-actuated automatic gas shutoff devices (ASCE 25-97) and the seismic switch.

Turning to FIG. 5, the operating parameters for automatic gas-valve shut-off devices as promulgated by ASCE standard 25-97 are shown along with the one preferred set of operating parameters for the seismic switch. Acceleration is plotted along the vertical axis and period is plotted along the horizontal axis. The must-actuate test points are shown along line (501). If a signal exceeds this line, under the ASCE standard 25-97, the gas-valve shut-off device must turn off. The non-actuation test points are shown along line (502). If a signal falls below this line, under the same standard, the gas-valve shut-off device may not turn off. The preferred threshold for the seismic switch is shown along line (503). Notably, it falls entirely below line (501), and only meets line (502) at the right-most data point.

This lower threshold is chosen to release doors even though only minor seismic activity has been detected. In applications such as a crowded commercial establishment, the seismic switch may be used to control the release of doors either directly or through a security system. When a minor earthquake occurs, it may not require that gas valves or similar such devices be turned off, but may still frighten people. In that event, if emergency doors were to remain locked and closed, people in a crowded commercial establishment may panic and rush for other exits. Such crowd panic can have seriously devastating results. To avoid this, emergency doors should be released even upon detection of minor seismic activity.

Accordingly, if a signal being measured has a magnitude larger than that specified for the actuation threshold for the signal's period, the valve must be shut-off. In order to make the seismic switch more sensitive to earthquakes, a threshold value of approximately 0.1 g, or more preferably 0.07 g, or still more preferably and precisely 0.065 g, is used for all signal periods between 0 and 1 second as illustrated in FIG. 5. (This is approximately equivalent to a VI on the Mercalli Scale.) In this manner, if a signal is being interpreted as that from an earthquake, the seismic switch activates (315) the corresponding relay (212) and the audible alarm (109).

Figure 3B:
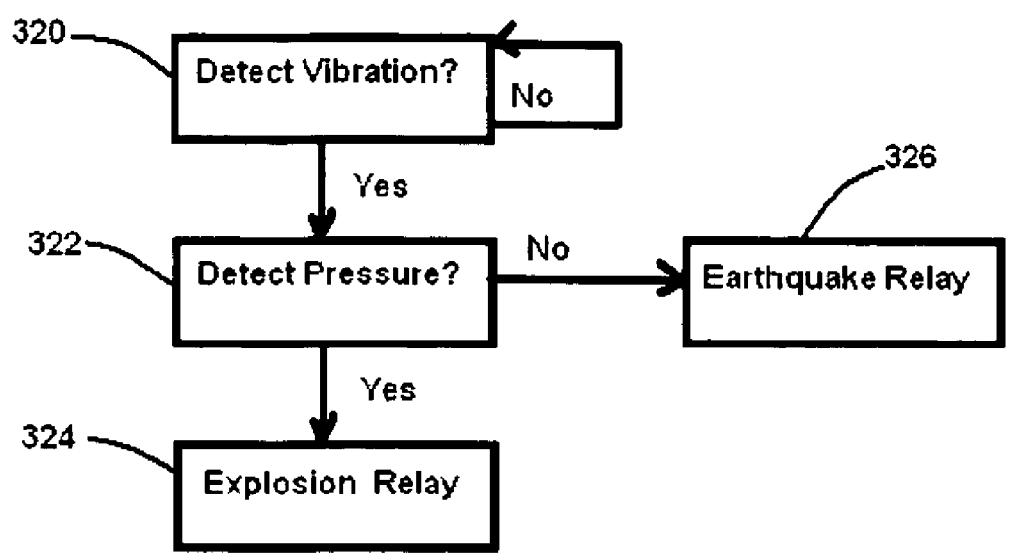
FIG. 3B is a flow chart of the control algorithm for the seismic switch of FIG. 2B.

Turning to FIG. 3B, another preferred method of operating the seismic switch of FIG. 2B is further described. The first step (320), the seismic switch monitors signals from the accelerometers (202 and 203). Specifically, the seismic switch monitors for a vibration signal of sufficient strength and/or duration that it would qualify as either an earthquake or an explosion. The level is set at 0.065 g with a period between 0 and 1 second. Upon detection of such an event (322), the seismic switch also monitors the signal from the pressure sensor (215). If this exceeds a threshold value, the seismic event was an explosion. The alarm LED (104), explosion relay (213) and audible alarm (109) are activated (324). If the pressure signal does not exceed the threshold value, the seismic event is an earthquake. The alarm LED (104) earthquake relay (212) and audible alarm (109) are activated (326). In addition, if the pressure sensor (215) detects a rapid change in pressure from an explosion, the seismic switch will signal an explosion even in the absence of any increase in signal level from the accelerometers (202 and 203).

Turning to FIG. 6 one preferred interaction between a seismic switch (405), a main control panel (601) to which the switch (405) is connected, a door (605) being controlled by the control panel (601), and a communication link (602) connecting to a remote monitoring center (603) is shown. In operation, the seismic switch (405) monitors for seismic signals. If any are detected, it determines whether it is an earthquake or an explosion. In the event of an earthquake, an earthquake signal (indicated by a closing relay) is sent to the main control panel (601); in the event of an explosion, an explosion signal (also indicated by a closing relay) is sent to the main control panel (601). The main control panel (601) includes other security functions. For example, it receives fire detection, intrusion, and any other security-related signals. In response to an earthquake signal, the main control panel (601) releases doors (604). It also performs other functions such as shutting down machinery, turning on or off pumps or motors or any other equipment. In a preferred embodiment, the main control panel (601) does not call the remote monitoring center (603) because if all security systems were to place such a call during an earthquake all circuits would become busy. In alternative embodiments, it could, nonetheless, place such a call. In response to an explosion signal, the main control panel (601) releases doors (604) and calls the remote monitoring center (603), which notifies the emergency responders (e.g., fire department). The doors (604) can be standard doors such as those used in the patents described above along with the background of the invention. Alternatively, the doors (604) may be part of a security door system used in banks and other commercial establishments (also known as man-trap doors) and as described in U.S. Pat. No. 6,308,644, titled "Fail-Safe Access Control Chamber Security System," and U.S. Pat. No. 6,298,603, titled "Access Control Vestibule," both by the instant inventor and both of which are expressly incorporated herein by reference in their entirety.

As also shown in FIG. 6, when a blast sensor (605) is used, it is mounted remotely so that it will detect any sudden changes in pressure. Because the enclosure of the seismic switch may filter or reduce rapid changes in pressure, the blast sensor (605) ordinarily should not be mounted inside the housing for the seismic switch. Instead, it is wired through the housing and connected with the microcontroller through a circuit-board connection.

Alternatively, the seismic switch can be used to control the release of one or more doors directly without a main control panel.

When the seismic switch is used along with delayed-egress fire doors, detection of a seismic event or an explosion overrides the delay so that the doors release immediately. More specifically, delayed egress fire doors are designed so that they do not immediately open. A person must push on a handle or other opening mechanism for a period of time, typically 15-30 seconds, before the door will open. An alarm, however, will sound immediately when a person pushes on the handle or other opening mechanism. These doors are commonly used in commercial establishments such as stores. Although an emergency exit is needed, a problem sometimes encountered is that a petty thief may take merchandise and flee through an emergency exit. The delayed egress doors operate to delay such an escape and permit security to respond, while at the same time permitting the doors to open in a relatively short period of time in the case of an actual fire. The seismic switch, however, is wired to override the delayed egress feature. If a seismic event or explosion is detected, the doors will immediately release, without delay.

Physically, the main control panel typically is constructed of a metal box. The seismic switch as shown and described is approximately the size of a standard 12 volt, 4 amp, d.c. battery so that it can fit inside the box containing the main control panel. More particularly, the dimensions of the seismic switch do not exceed five inches in either height, width or depth. More preferably, the seismic switch is approximately three and a half inches high, four and a half inches wide, and two and a half inches deep. Although the seismic switch can be smaller or larger, this approximate size is preferred because a smaller size can be difficult to firmly mount on a vibration table for testing.

Figure 7A:
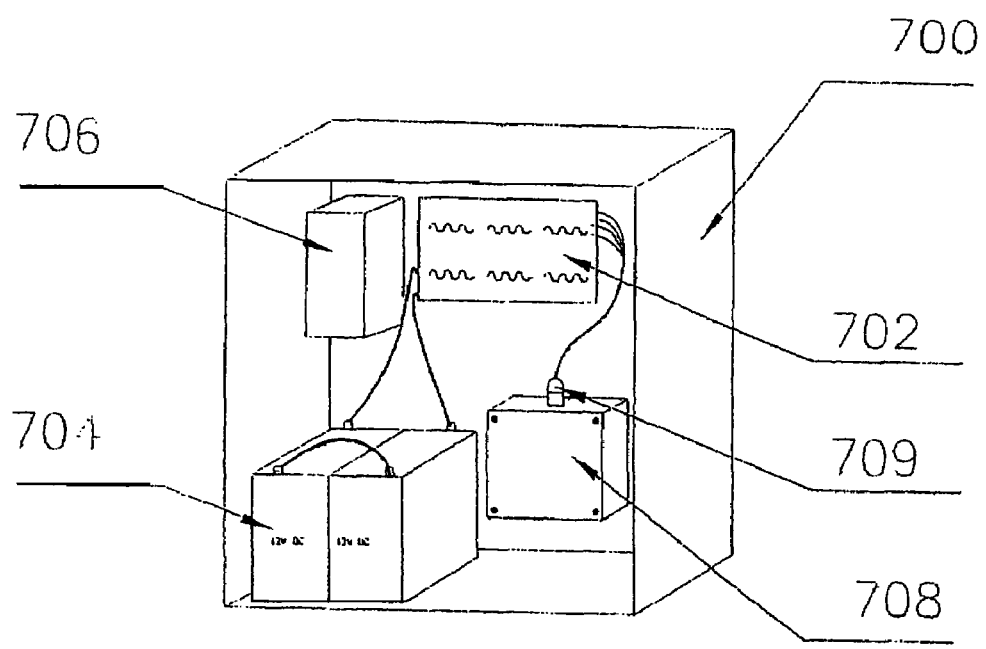
FIG. 7A is a perspective view of a control panel (either fire or door), including a seismic detection system.

Turning to FIG. 7A, a seismic switch (708) is shown as part of a control panel (700). The control panel (700) can be either a fire control panel or a door control panel. The control panel (700) includes an external housing in which the various components are mounted. These include circuit board (702) which includes a controller for the panel's functionality, standard batteries (704) and power supply (706). As shown, seismic switch (708) is approximately the same size as the standard batteries (704) and fits in the space which is ordinarily provided in the control panel for them. The seismic switch is mounted to the back of the control panel by the mounting plate (shown in FIGS. 7c and 7d). Wires run from the seismic switch (708) to the circuit board (702) through a connector (709) (preferably a Cannon plug) to provide power to the seismic switch and to provide the seismic signal (or switch) to the controller on the circuit boar (702).

In an alternative configuration, the seismic switch (708) is mounted outside the control panel (700) and the connecting wires run through a hole in the side of the control panel's enclosure. In this configuration of the seismic switch (708), the connecting cable is armored to prevent cutting or shorting of the cable wires. In addition, this configuration requires a keyed reset switch (which is not necessary if the seismic switch (708) is contained within a keyed control panel).

Similar to a smoke sensor/detector, the seismic sensor should be periodically tested. The frequency of such testing will depend upon fire code and standards. Absent a code or standards establishing otherwise, the testing should be conducted on the order of every six (6) months, or on an annual basis.

Figure 7B:
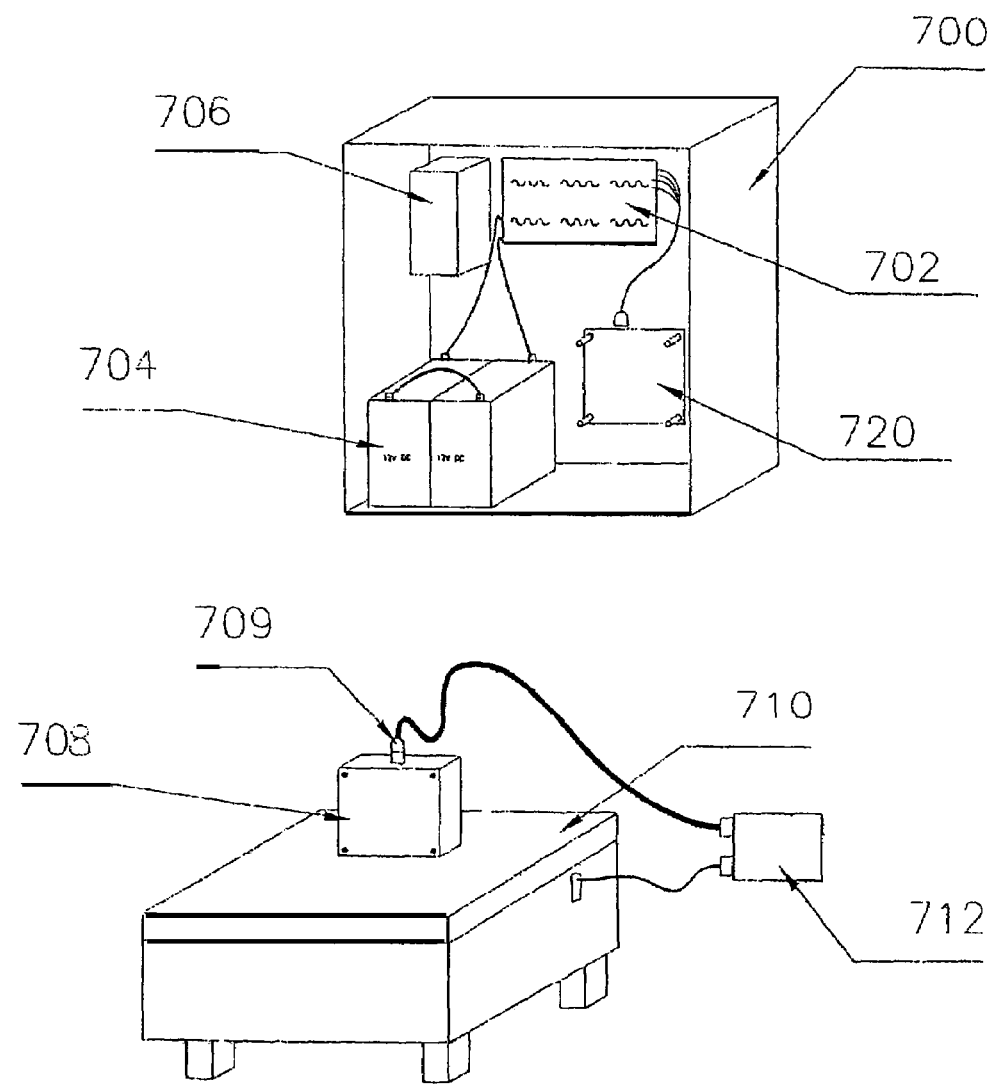
FIG. 7B is a perspective view of the control panel of FIG. 7A, where the seismic detection system has been removed and placed upon a vibration table for testing.

To test the seismic sensor, it is dismounted from inside the control panel (700), disconnected by connector (709) and placed on a vibration table (710), which are also known as shaker tables. This is shown in FIG. 7B. A programmed controller (712) operates the vibration table (710). With reference to the actuation points shown in FIG. 5, the seismic sensor (708) is checked at a number of different points to ensure proper operation. First the vibration table (708) is set at a triggering amplitude and a long period (e.g., 0.20 g with 1.0 second period). This should cause the detection of an earthquake. The seismic sensor is then reset and a new vibration applied which should not active any alarm condition (e.g. 0.05 g with a 0.1 second period).

Preferably, test points at 1, 2.5, 5 and 10 Hz are made. Additional points may be used to further ensure proper operation.

The proper operation of the seismic switch (708) can be determined from either the front panel lights provided on the seismic switch or from the signals provided to the circuit board (702) or from the programmed controller. If the lights on the front panel are used, then a separate light is provided on the front panel for each type of alarm condition. If the seismic switch (708) passes these tests, it is operating properly and is re-mounted in the control panel (700) as shown in FIG. 7A.

In another preferred test configuration, the seismic switch (708) is removed from the control panel 708 and an extension cord is used to extend the length of the connection between the control circuit (702) and the seismic switch (708). This permits the testing of the operation of the control panel circuitry along with the seismic switch (708). This configuration may be used to comply with any applicable codes or standards.

Figure 7C:
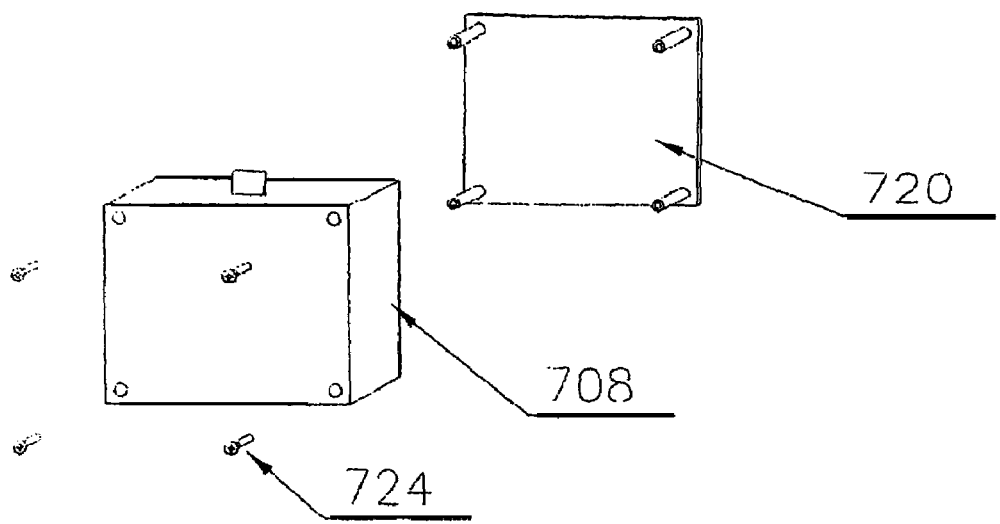
FIG. 7C is an exploded view of the mounting system for the seismic detection system of FIG. 7A from a front perspective.
Figure 7D:
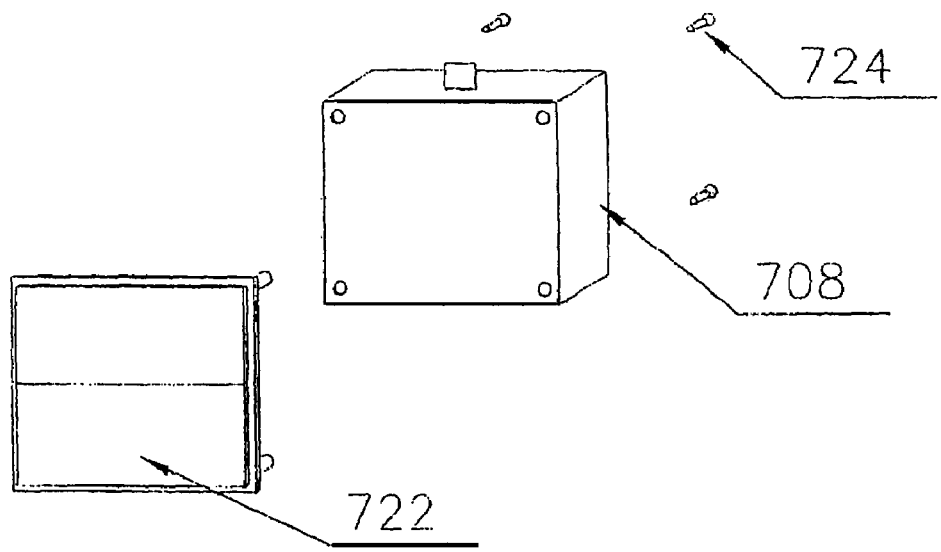
FIG. 7D is an exploded view of the mounting system for the seismic detection system of FIG. 7A from a back perspective.

Turning to FIGS. 7C and 7D, one preferred method of mounting the seismic switch (708) is further described. A mounting plate (720) is provided. On the back face of the mounting plate (720), structural tape (722) bonds it to the control panel enclosure (shown in FIG. 7B). A stand-up is provided on each corner of the mounting plate (720). Screws (724) pass through the corners of the seismic switch (708) to engage the stand-ups.

Figure 8:
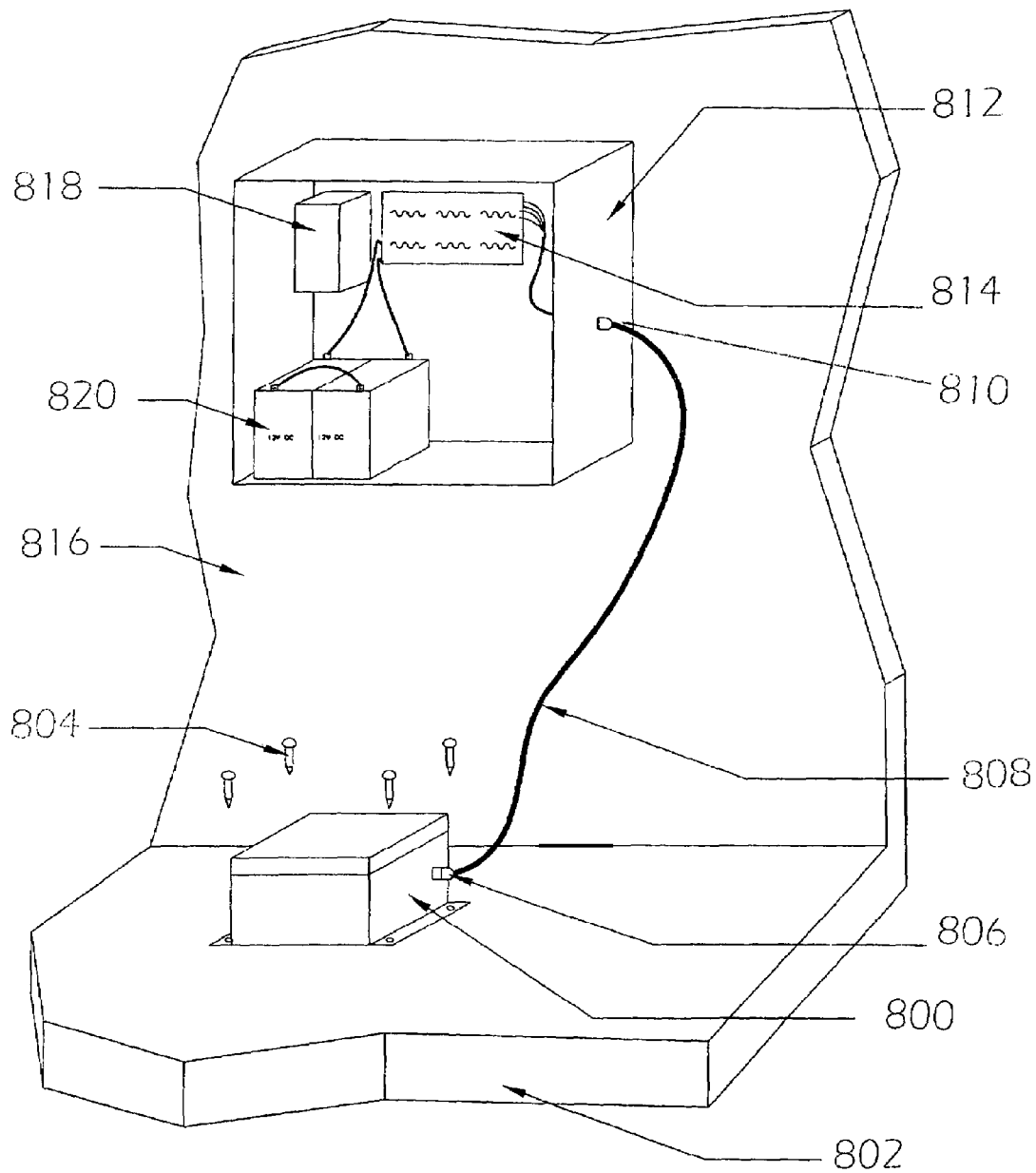
FIG. 8 is the seismic detection system similar to that of FIG. 7A, but in a floor-mount configuration.

Turning to FIG. 8, another preferred embodiment is shown. In some applications, the walls may themselves move or vibrate, which can cause false alarms. Where the floor (802) is more stable, the seismic detector (800) is preferably mounted there. Mounting screws (804) hold the seismic sensor (800) in place. Signals from the seismic sensor (800), pass through a connector (806) mounted in the housing. These pass through a cable (808) and then through another connector (810), as they enter the security panel (812). These signals are then fed to the control circuitry (814). Unlike the seismic sensor (800), the security panel (812) can be mounted on wall 816 as it is not sensitive to movement or vibration. The security panel includes standard components such as a power supply (818) and batteries (820).

In another preferred configuration, an additional DC power supply is used to power the seismic sensor (800). When the seismic sensor (800) detects an earthquake or explosion, it can switch relays. This can draw a significant amount of power and can cause a spike on the power line. To avoid any interference between the operation of the seismic sensor (800) and any other safety system circuits, an additional DC power supply is provided. This power supply connects directly to AC and the power is fed through cable (808). An additional connector can be provided on the seismic sensor to receive this power. In addition, the seismic sensor (800) can be mounted inside an explosion-proof and/or waterproof housing. In this configuration, an external alarm is used, which is mounted on the housing. An additional connector is used to provide the signal from the seismic sensor (800) to the external alarm.

Figure 9A:
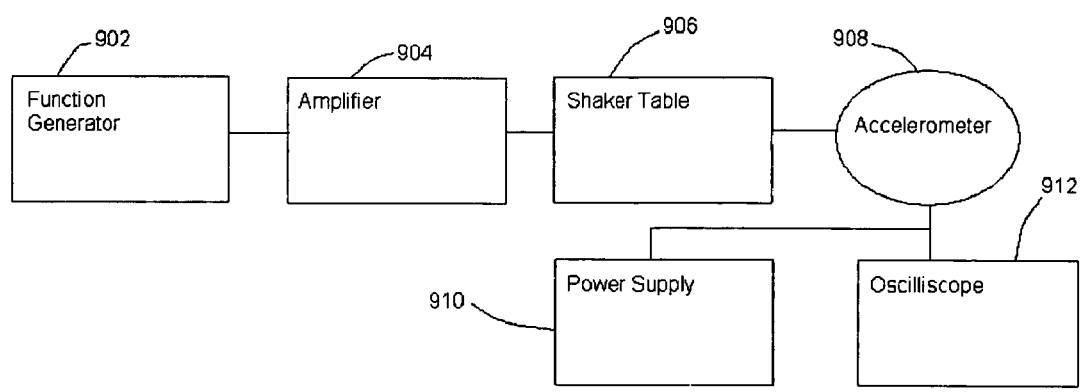
FIG. 9A is a block diagram showing one alternative method of testing a seismic switch.

Turning to FIG. 9A, another preferred method of testing a seismic switch is described. The testing system includes a function generator (902), an amplifier (904), a shaker table (906), an accelerometer (908), a DC power supply (910) and an oscilloscope (912). The seismic switch is fixedly mounted on the shaker table (906) and DC power is provided through a connector as shown in FIG. 7B. The shaker table (906) is driven and controlled by function generator (902). Specifically, function generator (902) provides a sinusoidal signal that passes through amplifier (904) on its way to the shaker table (906). The function generator (902) provides a precision signal with controlled amplitude and period. A calibrated accelerometer (908) is also fixedly mounted on the shaker table (906). The accelerometer (908) is powered by DC power supply (910) and its signal is provided to an oscilloscope (912).

In operation, the function generator (902) is controlled to generate a signal with a specific period. Initially, the amplitude is set at a low level and increased. The amount of acceleration generated on the shaker table (906) is determined by the signal from the accelerometer (908). Specifically, the signal is displayed on the oscilloscope (912) and a maximum and minimum voltage of the signal is determined. The difference between the maximum and minimum is divided by two and further divided by the sensitivity of the accelerometer (908). The amplitude of the signal from the function generator (902) is increased until this amplitude reaches at least 0.075 g. This should trigger an alarm from the seismic sensor after 2-4 seconds. This test is repeated for 1, 2.5, 5 and 10 Hz sinusoidal signals. This test is repeated along each axis of the seismic sensor. The seismic sensor is removed, rotated 90 degrees and remounted on the shaker table (906) so that the x, y and z axis are each tested. Frequency signals outside of this range can be used for purposes of testing. In operation, signals above 10 Hz should not generate an alarm condition.

Figure 9B:
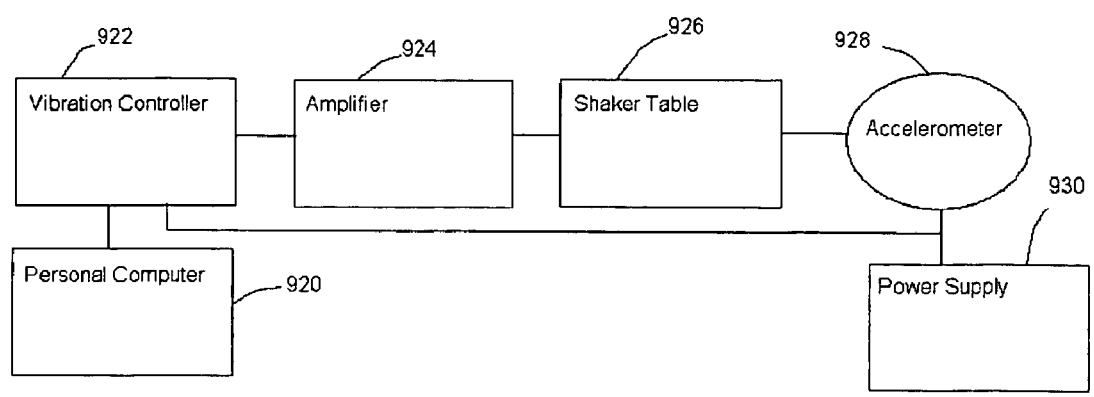
FIG. 9B is a block diagram showing another alternative method of testing a seismic switch.

Turning to FIG. 9B, another preferred configuration for testing the seismic sensor is described. This configuration uses a personal computer (920), a vibration controller (922), an amplifier (924), a shaker table (926), an accelerometer (928) and a power supply (930). The personal computer (920) and vibration controller (922) operate to generate specific waveform patterns. The vibration controller (922) and software for the personal computer (920) are commercially available from Vibration Research, 2385 Wilshere Dr., Suite A Jenison, Mich. 49428, USA. Data representing a waveform is loaded into the personal computer (920). This data is reconstructed into a continuous-time signal and drives the vibration controller (922). For purposes of testing, data from three earthquakes were obtained from the California Department of Conservation, which maintains an Internet web site. Two specific waveforms used are designated CE22791_CH1 and CE37737_CH3, each of which had shocks exceeding 0.065 g for longer than 4 seconds. Another waveform used was designated CE36453_CH1, which was a tremor of low amplitude and short duration. It had an amplitude of less than 0.065 g for less than 2 seconds. The output from the vibration controller (922) is fed to an amplifier (924), which drives the shaker table (926). The DC power supply (930) powers the accelerometers (928). A signal from the accelerometers is fed to the vibration controller (922), and can be displayed on the computer (920).

As with the sinusoidal test described above, the test is repeated along the x, y and z axis for each data set. The seismic switch should activate an alarm for both of the two signals that have a signal amplitude exceeding 0.065 g. for longer than 4 seconds and should not activate for the other signal. If the seismic switch operates properly for each of the three signals in each of the three directions then it has successfully passed the operational test.

As those skilled in the art will appreciate, many variations and modifications can be made to the preferred embodiments described above without departing from the spirit of the invention. For one example, the seismic switch must be reset manually after a loss of power. All such variations and modifications are intended to be encompassed within the scope of the following claims.

I claim:

1. A seismic switch comprising:
   at least one accelerometer;
   a pressure sensor;

a controller operationally coupled with the at least one accelerometer and the pressure sensor, wherein the controller is configured to monitor signals from the accelerometer and the pressure sensor to detect an earthquake and to detect an explosion, wherein an earthquake is distinguished from an explosion based upon a signal from the pressure sensor;

a door release circuit operationally coupled with the controller and configured to release a door upon detection of an earthquake or an explosion; and an emergency call circuit operationally coupled with the controller and configured to initiate an emergency call upon detection of an explosion but not upon detection of an earthquake.

2. The seismic switch of claim 1, wherein the at least one accelerometer comprises a first accelerometer configured to detect vibrations along a first axis and a second accelerometer configured to detect vibrations along a second axis, orthogonal to the first axis.

3. The seismic switch of claim 2, wherein the controller detects an earthquake when acceleration measured through the first and second accelerometers exceeds 0.065 g and the pressure measured through the pressure sensor changes less than a predetermined threshold.

4. The seismic switch of claim 3, wherein the controller detects an explosion when acceleration measured through the first and second accelerometers exceeds 0.065 g and the pressure measured through the pressure sensor changes more than a predetermined threshold.

5. The seismic switch of claim 4, wherein the controller comprises analog-to-digital converters and wherein the signals from the first and second accelerometers and the pressure sensor are received and converted by the analog-to-digital converters.

6. The seismic switch of claim 5, wherein the door release circuit comprises a relay for releasing a door.

7. The seismic switch of claim 6, wherein the emergency call circuit comprises a relay for activating a pre-recorded call to an emergency responder.

8. The seismic switch of claim 7, further comprising an alarm indicator operationally coupled with the controller and configured to indicate an alarm condition upon detection of an earthquake or an explosion.

9. The seismic switch of claim 8, further comprising a keyed reset operationally coupled with the controller to reset the alarm condition.

10. A method of operating a seismic switch comprising the steps of:
providing a seismic switch having:
at least one accelerometer;
a pressure sensor; and
a controller operationally coupled with the at least one accelerometer and the pressure sensor, wherein the controller monitors signals from the at least one accelerometer and the pressure sensor to detect an earthquake and to detect an explosion, wherein an earthquake is distinguished from an explosion based upon a signal from the pressure sensor;
releasing at least one door and activating an emergency call circuit upon detection of an explosion; and
releasing at least one door but not activating an emergency call circuit upon detection of an earthquake.

11. The method of claim 10, wherein the controller is configured to detect an earthquake when acceleration as measured through the plurality of accelerometers exceeds 0.065 g.

12. The method of claim 10, further comprising the steps of:
fixedly mounting the seismic switch;
periodically dismounting the seismic switch and placing the seismic switch on a vibration table, wherein the vibration table is operated to simulate the condition of an earthquake; and
re-mounting the seismic switch when the seismic switch operates to detect an earthquake in response to the simulated condition of the earthquake.

13. A method of operating a seismic switch comprising the steps of:
providing a seismic switch configured to detect an earthquake;
fixedly mounting the seismic switch;
periodically dismounting the seismic switch and placing the seismic switch on a vibration table, wherein the vibration table is operated to simulate the condition of an earthquake; and
re-mounting the seismic switch when the seismic switch operates to detect an earthquake in response to the simulated condition of the earthquake.

14. The method of claim 13, wherein the step of operating the vibration table comprises shaking the vibration table to generate an acceleration of at least 0.065 g.

15. The method of claim 13, wherein the step of providing the seismic switch comprises providing:
a set of accelerometers that generate electronic signals in response to vibrations caused by an earthquake;
a controller operationally coupled with the set of accelerometers and configured to receive the electronic signals and to determine whether the electronic signals represent an earthquake;
a switch having a first and a second state, operationally coupled with the controller, wherein the controller changes the state of the switch upon detection of an earthquake; and
a first enclosure for housing the set of accelerometers, the controller and the switch.

16. The method of claim 15, wherein in the step of providing the seismic switch, the switch comprises a relay.

17. The method of claim 15, wherein in the step of providing the seismic switch, wherein the switch comprises an electronic switch.

18. A method of periodically testing a seismic switch comprising the steps of:
mounting the seismic switch on a shaker table;
operating the shaker table to simulate a first tremor having an amplitude less than a pre-determined amplitude, wherein the seismic switch does not activate an alarm condition;
operating the shaker table to simulate a second tremor having an amplitude greater than the predetermined amplitude, wherein the seismic switch does activate an alarm condition; and
removing the seismic switch from the shaker table and rotating the seismic switch by 90 degrees and remounting the seismic switch on the shaker table to test the seismic switch along another axis by repeating the forgoing steps.

19. The method of claim 18, wherein the shaker table is driven by a signal generator and wherein the first tremor and the second tremor are simulated by a sinusoid.

20. The method of claim 19, wherein the amplitude of the first tremor is less than 0.065 g and the amplitude of the second tremor is greater than 0.065 g.

21. The method of claim 20, wherein the second tremor has a frequency between approximately 1 and 10 Hz.

22. The method of claim 21, wherein the first tremor has a frequency greater than 10 Hz.

23. The method of claim 18, wherein the shaker table is driven by a controller and wherein the first tremor and the second tremor are simulated to match data obtained from an earthquake.

24. The method of claim 23, wherein the amplitude of the first tremor is less than 0.065 g and the amplitude of the second tremor is greater than 0.065 g.

25. The method of claim 24, wherein the first tremor has a duration of less than 2 seconds and the second tremor has a duration of at least approximately 4 seconds.

* * * * *